(12) United States Patent
Adams et al.

(10) Patent No.: US 12,499,408 B2
(45) Date of Patent: Dec. 16, 2025

(54) SYSTEMS AND METHODS FOR A SMART PRODUCT HANDOFF INTEGRATED PLATFORM

(71) Applicant: Arizona Board of Regents on Behalf of Arizona State University, Tempe, AZ (US)

(72) Inventors: Chase Adams, Tempe, AZ (US); Tyler Smith, Phoenix, AZ (US); Mark Naufel, Phoenix, AZ (US); Rakshith Subramanyam, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 561 days.

(21) Appl. No.: 17/998,142

(22) PCT Filed: May 7, 2021

(86) PCT No.: PCT/US2021/031342
§ 371 (c)(1),
(2) Date: May 17, 2023

(87) PCT Pub. No.: WO2021/226491
PCT Pub. Date: Nov. 11, 2021

(65) Prior Publication Data
US 2023/0267406 A1     Aug. 24, 2023

Related U.S. Application Data
(60) Provisional application No. 63/021,451, filed on May 7, 2020.

(51) Int. Cl.
G06Q 10/0833 (2023.01)
G06K 7/14 (2006.01)
G06T 7/20 (2017.01)
G06T 7/70 (2017.01)

(52) U.S. Cl.
CPC ....... *G06Q 10/0833* (2013.01); *G06K 7/1443* (2013.01); *G06T 7/20* (2013.01); *G06T 7/70* (2017.01)

(58) Field of Classification Search
CPC ......... G06Q 10/0833; G06T 7/70; G06T 7/20; G06K 7/1443
See application file for complete search history.

(56) References Cited

U.S. PATENT DOCUMENTS

| | | | |
|---|---|---|---|
| 8,924,227 B2* | 12/2014 | Fellows | G06Q 20/203 705/2 |
| 2014/0279294 A1 | 9/2014 | Field-Darragh et al. | |
| 2017/0228686 A1 | 8/2017 | Bermudez Rodriguez et al. | |
| 2017/0300854 A1* | 10/2017 | Harcar | G06K 19/06103 |
| 2019/0304238 A1* | 10/2019 | Ambauen | G06Q 20/40145 |

OTHER PUBLICATIONS

QR Code. Wikipedia, entry from 2018 (Year: 2018).*
New Smart Countertop Technology Turns Almost Any Surface into a Touchscreen, Probuilder (Year: 2020).*

* cited by examiner

*Primary Examiner* — Ming Shui
(74) *Attorney, Agent, or Firm* — Polsinelli PC

(57) ABSTRACT

Various embodiments of a system and associated method for a smart handoff integrated platform for handoff of items to customers in the retail space are disclosed herein.

19 Claims, 11 Drawing Sheets

170

| | TIME: | 4:53 PM | JUST CALLED: | DERRICK | | |

READY

| | NAME: | STATUS: | ORDER INFO: | | |
|---|---|---|---|---|---|
| 1. | Rocco | READY 4:49 PM | COFFEE | 1/1 | 001 |
| 2. | Shawn | READY 4:50 PM | CHAI | 1/1 | 002 |
| 3. | Derrick | READY 4:51 PM | ICED TEA | 1/2 | 003 |

PENDING

| | NAME: | STATUS: | ORDER INFO: | | |
|---|---|---|---|---|---|
| 4. | Garrett | PENDING | COFFEE | 1/1 | 004 |
| 5. | Derrick | PENDING | BAGEL | 2/2 | 003 |

FIG. 4

SYSTEMS AND METHODS FOR A SMART PRODUCT HANDOFF INTEGRATED PLATFORM

FIELD

The present disclosure generally relates to product handoff technology, and in particular, to a smart product handoff technology, and in particular, to a smart product handoff integrated platform to optimize and track product handoff to customers in brick-and-mortar stores

BACKGROUND

A common issue in the retail sector is inefficient handoff of items to customers. In particular, large food chains such as Chipotle and Starbucks have inefficient processes around communicating with customers and delivering goods to them. The expectation of fast and trackable delivery of items is rapidly increasing, with options like same-day shipping becoming increasingly common for online retailers. However, for brick-and-mortar stores, a similar solution does not exist.

Some retailers include alphabetically-organized shelves and "pickup" counters. Neither solution scales to multiple orders—both require the customer to physically go through each item and find if it was made for them, which is both unsanitary and inconvenient. If the item is not found, the customer will ask an employee where their item is and if it has been made yet. The lack of transparency is inefficient and time-consuming for both parties. To add to this, employees typically have to announce the customer's name when an order is ready, which can be chaotic in a store with numerous customers. Lastly, when there are inefficiencies in this process, corporate leaders have no way of tracking performance on a store-to-store basis; if a store consistently has items sitting out for a long time and does not communicate well with customers, there is currently no way of identifying and correcting it. Thus, a more streamlined item handoff system is desired.

It is with these observations in mind, among others, that various aspects of the present disclosure were conceived and developed.

BRIEF DESCRIPTION OF THE DRAWINGS

FIG. 4 is an illustration showing an example leaderboard display corresponding with the smart handoff integrated platform of FIG. 3;

Corresponding reference characters indicate corresponding elements among the view of the drawings. The headings used in the figures do not limit the scope of the claims.

DETAILED DESCRIPTION

Figure 1:
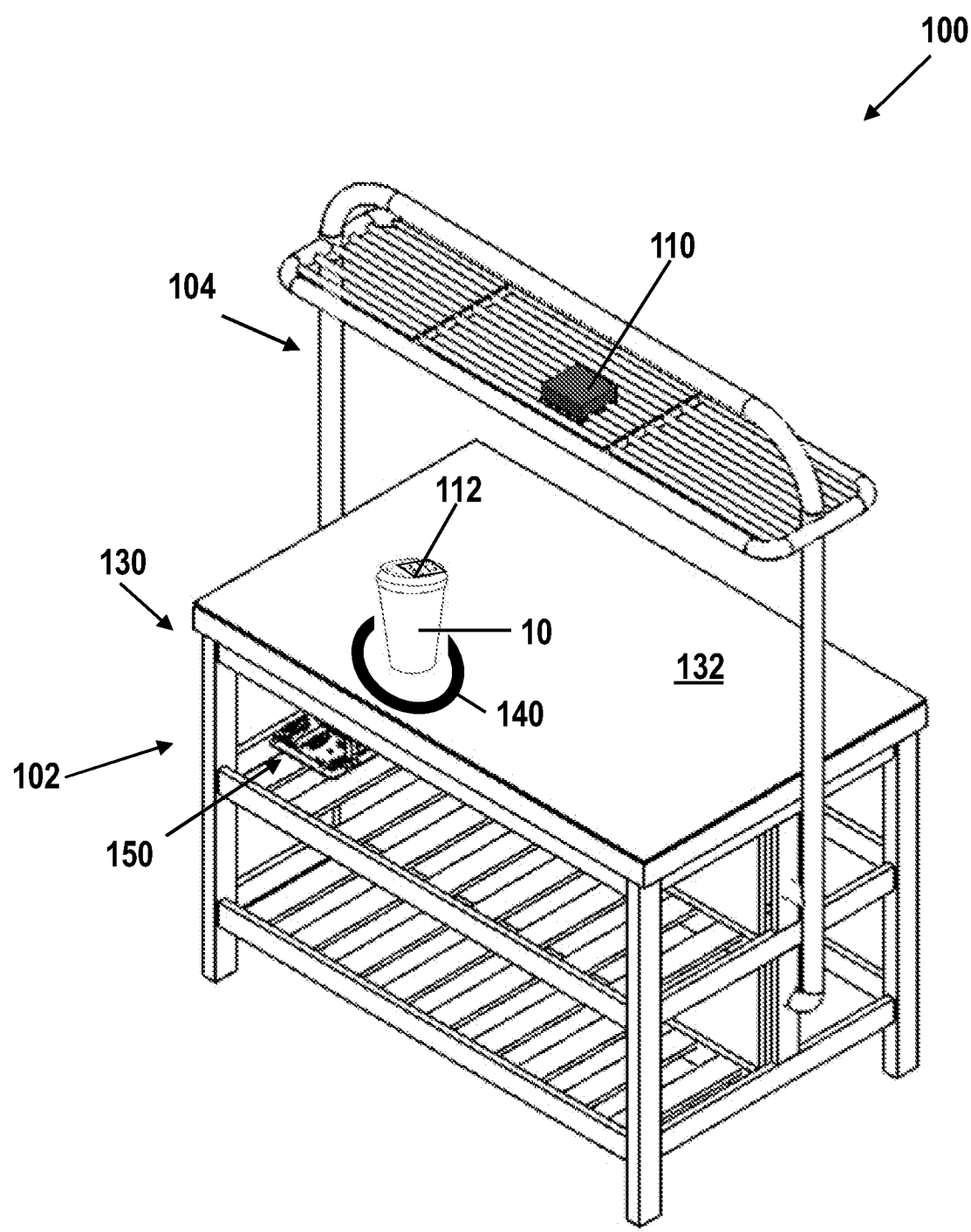
FIG. 1 is a perspective view of a first embodiment of a smart handoff integrated platform.

Various embodiments of a smart handoff environment including a smart handoff integrated platform are disclosed herein. In some embodiments, the smart handoff integrated platform includes a display system in communication with a tracking system for tracking items to be handed off and displaying pertinent information to the customer. In some embodiments, the display system is embodied as a platform that can support the item. The tracking system observes a location of the item on the platform and communicates the location of the item to the display system. The display system uses the location of the item to display an indicator near or around the item such that a customer can see the item on the platform and see pertinent information displayed near or around the item. The smart handoff integrated platform further includes one or more auxiliary systems including a secondary display to communicate order information or queue information to employees and customers. Referring to the drawings, embodiments of a smart handoff integrated platform are illustrated and generally indicated as 100 and 200 and an associated smart handoff environment is illustrated and generally indicated as 300 in FIGS. 1-11

Figure 5:
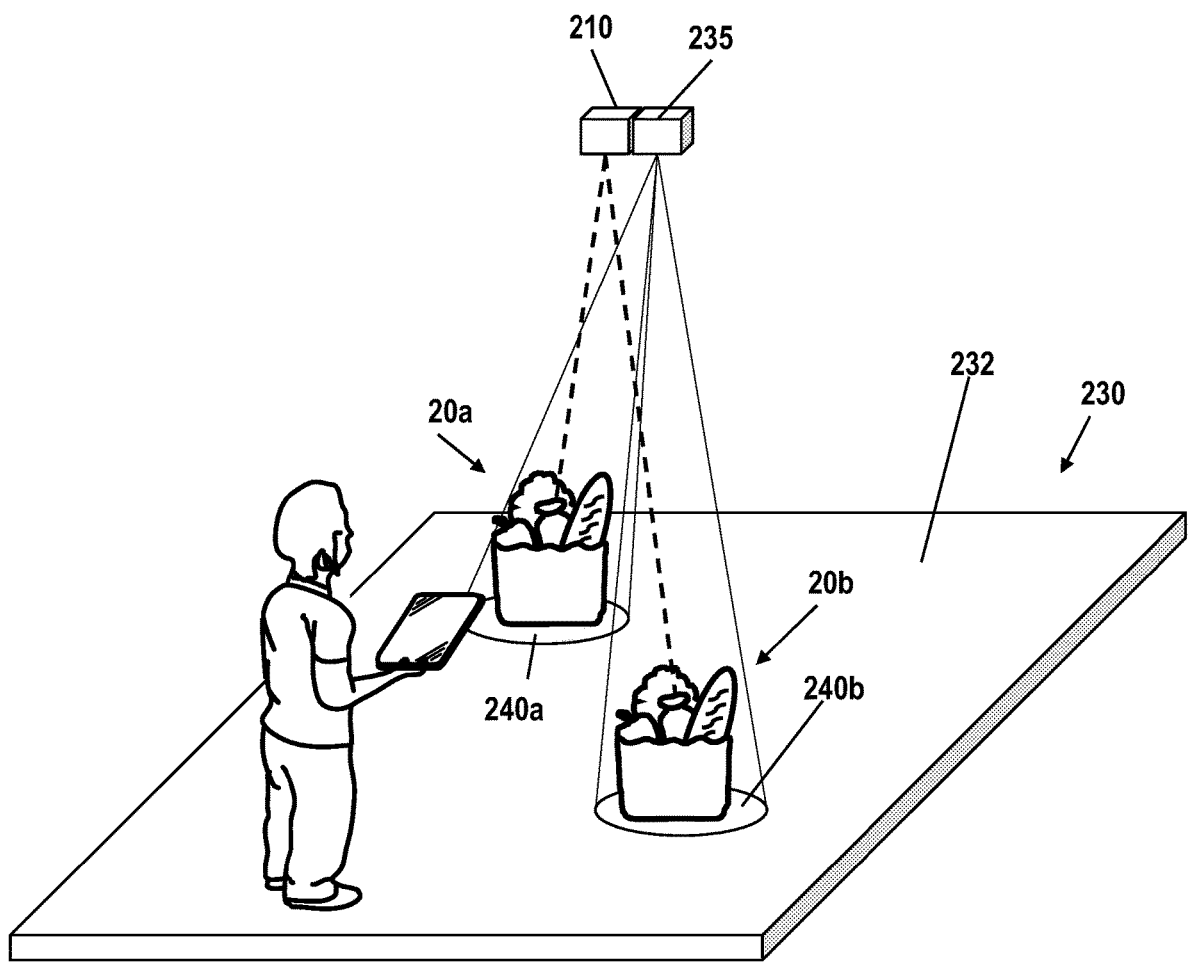
FIG. 5 is a simplified illustration showing a second embodiment of a smart handoff integrated platform.
Figure 6:
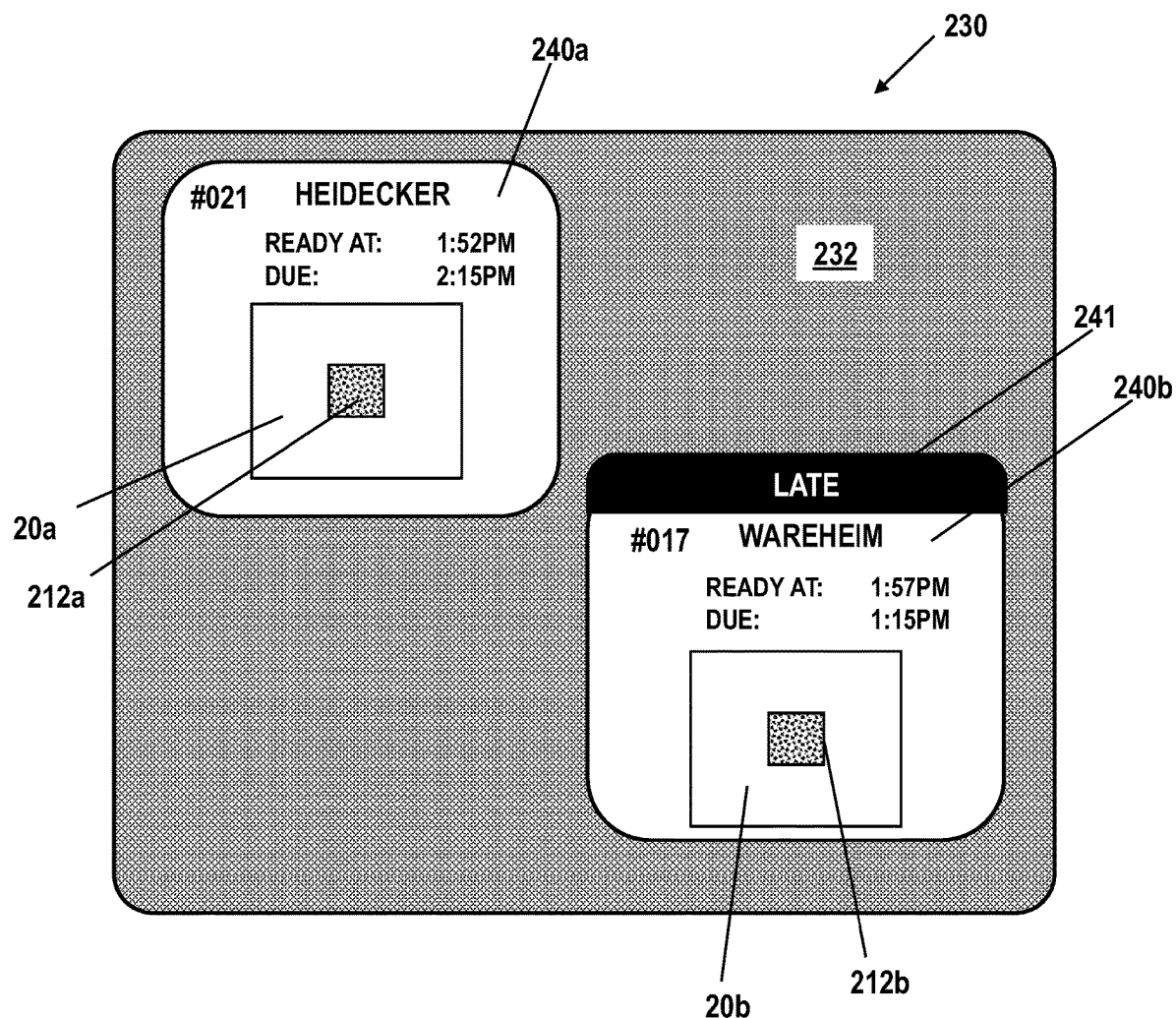
FIG. 6 is a simplified top view showing a display of the smart handoff integrated platform of FIG. 5.

Referring to FIGS. 1-8, in the smart handoff environment 300, the smart handoff integrated platform 100 communicates with a computer-implemented smart handoff system 500 that facilitates communication between a tracking system 104 and a display system 102. The tracking system 104 and display system 102 of the smart handoff integrated platform 100 collectively track one or more items 10 in an order on a physical surface 130, and display an indicator 140 on the physical surface 130 to display order information at the physical location of the item 10. The handoff platform 100 enables one to place an item 10 on the physical surface 130 for pickup and an indicator 140 is displayed on the physical surface 130 to provide individualized information about the item 10 itself. In a first embodiment shown in FIGS. 1-4, the smart handoff integrated platform 100 is illustrated for small-order handoff in a setting such as a café or coffee shop. A second embodiment of the smart handoff integrated platform 200 is illustrated in FIGS. 5 and 6 for large-order handoff such as for grocery delivery. FIGS. 7-10 illustrate aspects of the smart handoff environment 300 and the computer-implemented smart handoff system 500 of the handoff platform 100 and 200.

Figure 2:
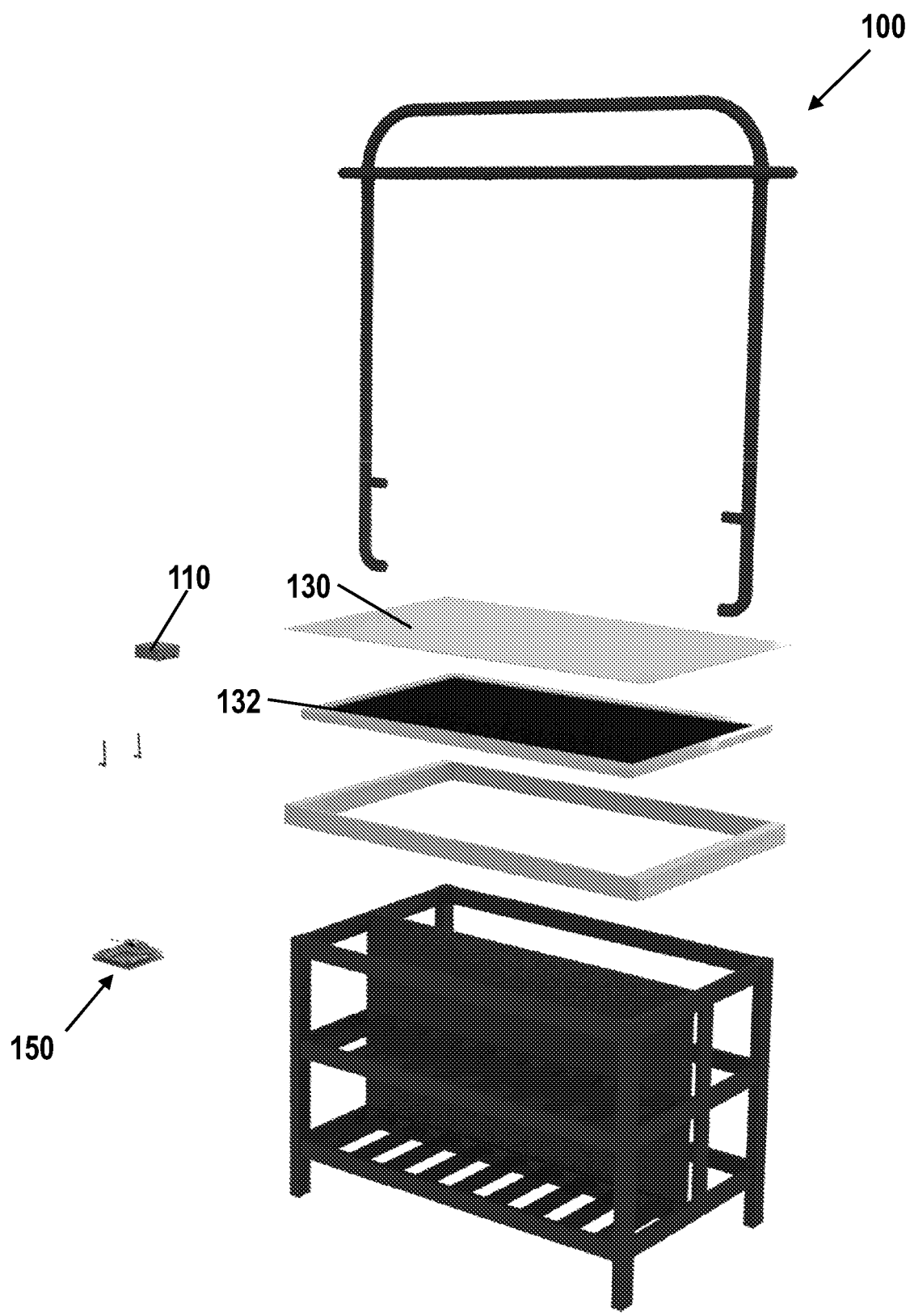
FIG. 2 is an exploded view of the smart handoff integrated platform of FIG. 1.
Figure 3:
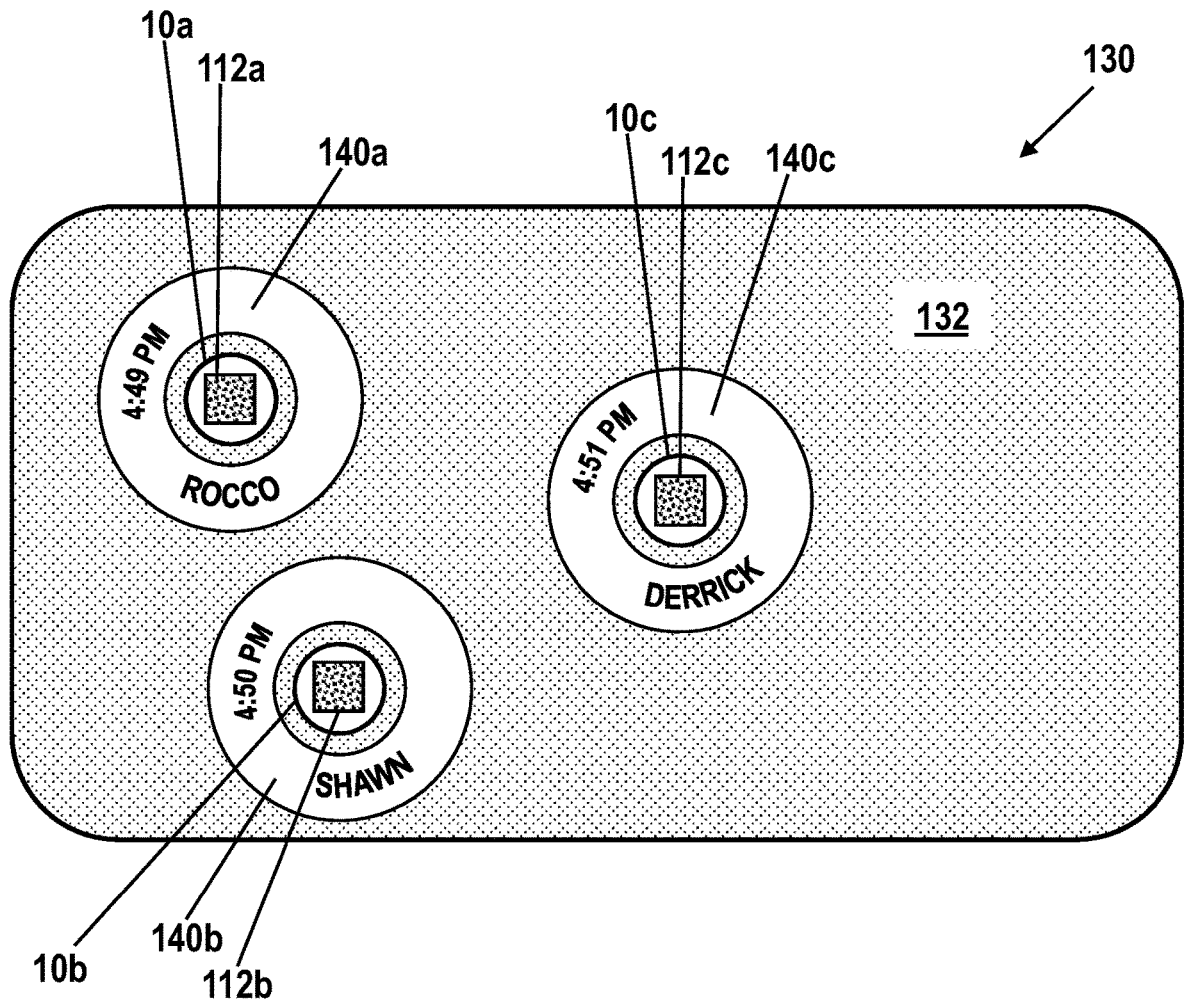
FIG. 3 is a simplified top view showing a display of the smart handoff integrated platform of FIG. 1 for an example small-item handoff scenario.

Referring to FIGS. 1-4, in some embodiments of the smart handoff integrated platform 100, the display system 102 includes a display 132 mounted horizontally on a surface 130 and is configured to support one or more items 10. The tracking system 104 is operable for determining a location of the item 10 on the surface 130 and communicating the location of the item 10 to the display system 102. The tracking system 104 includes a sensor 110 in communication with a computing system 400. The sensor 110 detects the item 10 and the computing system 400 determines the location of the item 10 and communicates the location of the item 10 to the display system 102. The tracking system 104 is also operable to read an individualized indicia 112 placed on the item 10 to determine an order identifier that links to identifying information about the item. The display system 102 takes this location of the item 10 and displays an indicator 140 on or around the item 10 using the display 132 and based on the location of the item 10. In some embodiments, the indicator 140 displays pertinent information based on the identifying information about the item 10 including a customer name, order number, fulfillment time, and any other details related to the order for improved handoff of items to the customer. An example surface 130 displaying indicators 140*a-c* for items 10*a-c* is shown in FIG. 3.

As discussed above and as shown in FIGS. 1-4, the tracking system 104 includes the sensor 110 in communication with a computing system 400 that runs or otherwise communicates with the computer-implemented smart handoff system 500 of the smart handoff platform 100. The sensor 110 may be embodied as a single or multi camera, RFID sensor, Bluetooth sensor, force sensor, or may be integrated with the display system 102 as a capacitive display system. The sensor 110 is operable to locate and track the movement of the item 10 on a surface such as the surface 130 and provide positional data indicative of a location of the item to computer-implemented smart handoff system 500. In some embodiments, the computing system 400 is embodied as a local or remote processor configured to execute or facilitate aspects of computer-implemented smart handoff system 500. Computer-implemented smart handoff system 500 processes input from the sensor 110 and communicates the data to the display system 102. The tracking system 104 takes positional data from the sensor 110 indicative of a positional location of the item 10 on the surface 130 and translates the positional data to correspond with a physical location of the item 10 to be tracked.

In another aspect, as shown in FIGS. 1 and 3, the item 10 can be equipped with an indicia 112 such as a barcode or matrix barcode (such as a Quick Response code) readable by the tracking system 104 to provide identifying information to the smart handoff platform 100 as to which order the item 10 belongs to. In some embodiments, the indicia 112 is indicative of an order identifier when interpreted by the tracking system 104. The tracking system 104 captures and reads the indicia 112 to ascertain an order identifier associated with the item 10 based on the indicia 112. The order identifier is processed by the computer-implemented smart handoff system 400 to retrieve identifying information about the order that corresponds with the order identifier. The computer-implemented smart handoff system 400 then generates an order-specific indicator 140 for display by the display system 102. In particular, the display system 102 displays the order-specific indicator 140 on the display 132 at the positional location of the item 10. In some embodiments, the indicator 140 may be embodied as a ring, arrow, box, spotlight, or other identifier near the item 10 and may be color-coded, and may include a customer name, order number, or other identifiers related to the order (i.e. allergy information, modifications to the order, time of fulfillment).

In the example shown in FIG. 3, a small-item handoff scenario using smart handoff platform 100 is shown. Items 10*a*, 10*b* and 10*c* respectively displaying indicia 112*a*, 112*b* and 112*c* and each belonging to different orders are placed on the surface 130. In particular, indicia 112 can be a sticker or other similar marker that is placed on the item 10 such that the indicia 112 is visible to the sensor 110 of the tracking system 104. The sensor 110 of the tracking system 104 identifies a positional location of each item 10*a-c* on the platform in terms of positional data by tracking a location of each indicia 112*a*-112*c*. In some embodiments, the tracking system 104 identifies corners of the indicia 112 as reference points to identify the location of each item 10. Positional data is then used by the computer-implemented smart handoff system 400 to display indicators 140*a*-140*c* for each individual item 10*a*-10*c* on the display 132 at respective physical locations of each item 10*a*-10*c* on the surface 130. The sensor 110 is further configured to capture the machine-readable indicia 112*a-c* and provide information to the computer-implemented smart handoff system 400 for identification of the order and generation of the order-specific indicator 140*a*-140*c*. As shown, each indicator 140*a*-140*c* is configured to display individualized information at the location of the item including customer names and a time of item placement.

In most embodiments, the smart handoff platform 100 is configured to update the indicator 140 in real-time. For example, if an item 10 placed on the surface 130 is identified by the tracking system 104 to be in a first location, and the item 10 is picked up and moved to a second location on the surface 130, then the tracking system 104 is operable to capture a new location of the item 10 and update the location of the associated indicator 140 on the display 132 to the second location. Similarly, in some embodiments, as order information can be subject to change, the indicator 140 can also update the displayed individualized information in real-time if the order information is updated at any point. In this manner, a plurality of items 10 can be placed on the surface 130 and the smart handoff platform 100 is operable to capture each item 10 of the plurality of items and display fully up-to-date information about the item 10.

In some embodiments, as shown in FIGS. 1-3, the display system 102 of the smart handoff platform 100 includes a physical surface, herein referred to as the surface 130, and a display 132 integrated into the platform for visually displaying information. As shown, in some embodiments, the surface 130 and display portion 132 are configured such that the item 10 may be placed on the surface of the surface 130 directly over or on the display portion 132. The surface 130 may be manufactured of materials including, but not limited to, acrylic, polycarbonate, metal, or glass. In some embodiments, the display portion 132 is embodied as a sub-surface or overhead display, including, but not limited to, an under-mounted flat-panel display such as an LCD/LCD/gas-plasma screen or an overhead projector, as will be discussed in terms of the smart handoff integrated platform 200 of FIGS. 5 and 6. In some embodiments, the display system 102 also includes a local or remote computing module 150 in direct communication with the display portion 132 for producing the visual content to be displayed in response to the location of the item 10 as provided by the tracking module 104. In other embodiments, the display system 102 communicates with computing device 400 to receive data for display.

Figure 7:
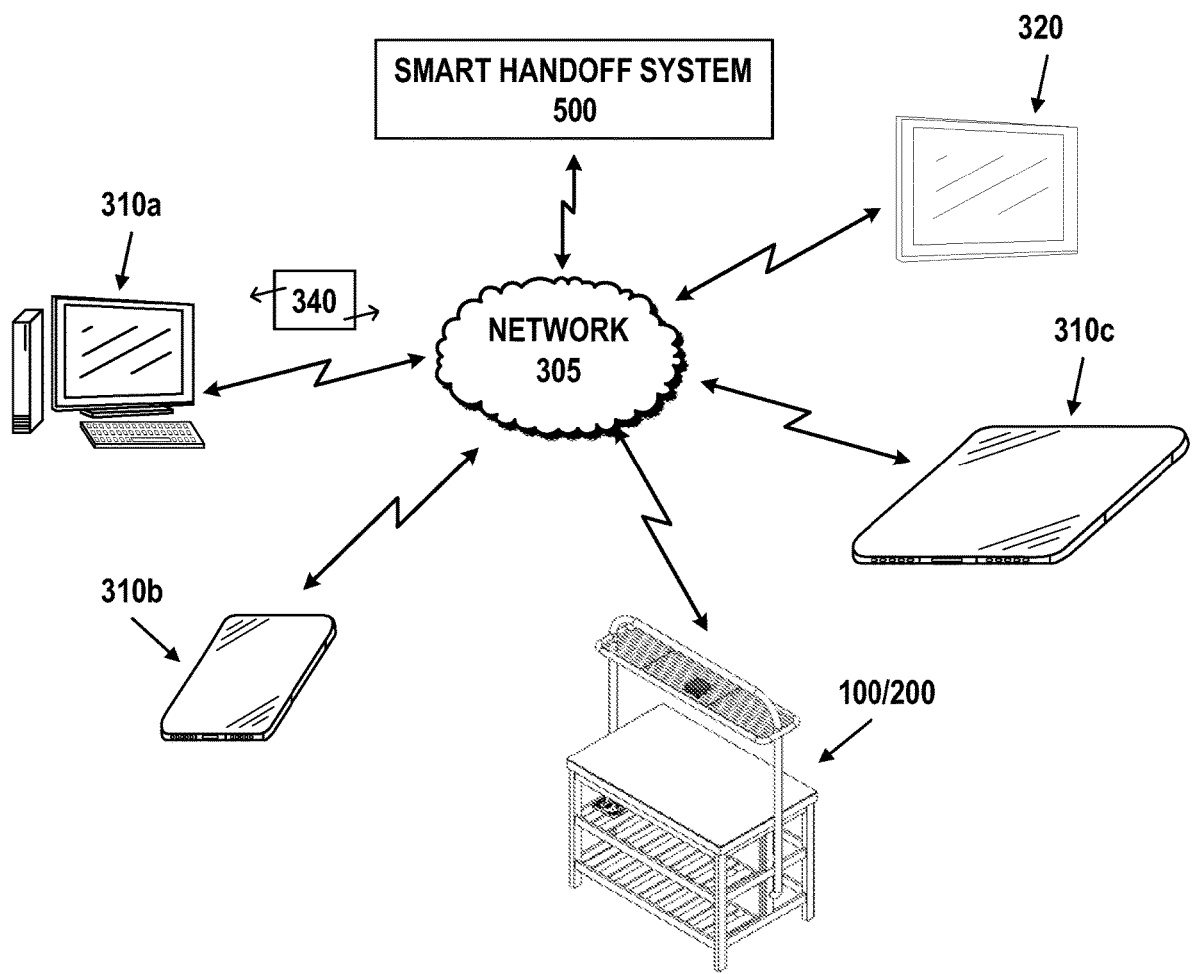
FIG. 7 is a simplified diagram showing a smart handoff environment for integration of the smart handoff integrated platform of FIG. 1 or FIG. 5.

In some embodiments, the smart handoff integrated platform 100 includes one or more auxiliary systems (not shown). Examples of these one or more auxiliary systems include but are not limited to a "leaderboard" display (FIG. 4) to communicate the status of orders, a scanner (not shown) to associate user data with a pre-printed and reusable indicia (to be tracked by the Tracking System), and/or a speaker system (not shown) to verbally announce information regarding the status of orders. Some embodiments of the auxiliary systems also include the following software systems: a metrics system to visualize the time-to-pickup on a customer/store/corporate level, per-user customizations to define visuals that can be associated with a user and shown on the display 132, and a notification system to inform a user of order status through a push notification, email, text message, or other form of remote communication across one or more devices 310 (FIG. 7).

In the example of FIGS. 3 and 4, one example of a leaderboard interface 170 for display on an auxiliary display 320 (FIG. 7) or one or more devices 310 associated with the smart handoff integrated platform 100 is illustrated. The leaderboard interface 170 and auxiliary display 320 are configured to communicate with the computer-implemented smart handoff system 500 and surface 130 to display order status. As shown, three items 10*a*-*c* are illustrated on the surface 130 of the smart handoff integrated platform 100. The corresponding leaderboard interface 170 shows order information for the three items 10*a*-*c* as well as order information for two additional pending items. In some embodiments, the smart handoff integrated platform 100 is operable to update the information shown in the leaderboard interface 170 in real-time based on a detected presence of an item 10 on the surface 130. In one illustrative example, suppose a barista were to complete part of order 003 for "Derrick" and place the item 10*c* with indicia 112*c* on the surface 130. The tracking system 104 is operable to identify the item 10*c*, communicate with the computer-implemented smart handoff system 400 to update the order information associated with item 10*c* to denote a "ready" status, and then communicate the "ready" status on the leaderboard interface 170. Simultaneously, the smart handoff integrated platform 100 is operable to identify a positional location and order identifier of item 10*c* on the surface 130 and display an order-specific indicator 140*c* on display 132 at the detected location of the item 10*c*. In some embodiments, the order status is updated across a plurality of connected devices 310 (FIG. 7) when an item 10 is placed on and recognized by the smart handoff integrated platform 100.

In another embodiment of smart handoff integrated platform 200 shown in FIGS. 5 and 6, for large-scale orders such as grocery deliveries, a surface 230 can be embodied as a simple platform or surface, and the display 232 is projected onto the surface 230 from a projector 235 located above or below the surface 230 that projects an indicator 240 onto the surface 230. Similar to the indicator 140, indicator 240 features order-specific information at the detected positional location of an item 20. Like the first embodiment 100, the second embodiment of the smart handoff integrated platform 200 can include a tracking system 202 and a display system 204 in communication with computer-implemented smart handoff system 400. Tracking system 202 of smart handoff integrated platform 200 includes a sensor 210 that operates in a similar manner as tracking system 104 to capture a position and an order identifier of an item 20. As shown in FIG. 5, a display system of handoff integrated platform 200 includes the projector 235 that projects an indicator 240 onto the surface 230. In some embodiments, the surface 230 is a floor area suitable for placement of large-scale items such as a grocery order.

In the example shown in FIGS. 5 and 6, a large-order handoff scenario is illustrated in a grocery delivery environment utilizing smart handoff integrated platform 200. Groupings of items 20*a* and 20*b* respectively displaying indicia 212*a* and 212*b*, each belonging to different orders, are placed on the surface 230. In particular, indicia 212 can be a sticker, printed indicia on paper, or other similar marker that is placed on or near the items 20 such that the indicia 212 is visible to the sensor 210 of the tracking system 204. The sensor 210 of the tracking system 204 identifies a positional location of each item 20*a* and 20*b* on the surface 230 in terms of positional data by tracking a positional location of each indicia 212*a* and 212*b*. Positional data is then used by the computer-implemented smart handoff system 400 to display indicators 240*a* and 240*b* for each individual group of items 20*a* and 20*b* on the display 232 at respective physical positions of each group of items 20*a* and 20*b* on the surface 230. The sensor 210 is further configured to capture the machine-readable indicia 212*a* and 212*b* and provide information to the computer-implemented smart handoff system 400 for identification of the order and generation of the order-specific indicator 240*a* and 240*b*.

In some embodiments of the smart handoff integrated platform 200, the sensor 210 may be embodied as a single or multi camera, RFID sensor, Bluetooth sensor, force sensor, or may be integrated with the display system 202 as a capacitive display system. The sensor 210 is operable to locate and track the movement of the item 20 on a surface such as the surface 230 and provide positional data indicative of a location of the item to computer-implemented smart handoff system 500. In some embodiments, the computing system 400 is embodied as a local or remote processor configured to execute or facilitate aspects of computer-implemented smart handoff system 500. Computer-implemented smart handoff system 500 processes input from the sensor 210 and communicates the data to the display system 202. The tracking system 204 takes positional data from the sensor 210 indicative of a positional location of the item 20 on the surface 230 and translates the positional data to correspond with a physical location of the item 20 to be tracked.

As shown, each indicator 240*a* and 240*b* is configured to display individualized information at the location of the item including customer names and a time of item placement. In some embodiments, the indicator 240 may be embodied as a ring, arrow, box, or other identifier near or around the item 20 and may be color-coded, and may include a customer name, delivery person name, order number, or other descriptive values related to the order (i.e. special instructions, modifications to the order, time of order fulfillment, due date). In particular, for time-sensitive applications such as grocery delivery, the indicator 240 can include information such as an order number, a name, a time of placement, and a "due" time to denote a time that the group of items 20 need to be picked up, delivered, or otherwise moved. In some embodiments, the indicator 240 can include aspects to draw additional attention to a late order or an order that otherwise needs attention through a banner 241 or another visual effect such as blinking or changing color. As shown in the example display 232 on surface 230, grocery items 20*b* to the "Wareheim" family are late (indicator 240*b* notes that the order was due at 1:15 PM, but ready at 1:57 PM), as a result the smart handoff integrated platform 200 displays a banner 241 to draw attention to the late order.

In some embodiments, the smart handoff integrated platform 200 includes one or more auxiliary systems (not shown). Examples of these one or more auxiliary systems include but are not limited to a "leaderboard" display (FIG. 4) to communicate the status of orders, a scanner (not shown) to associate user data with an identifier (to be tracked by the Tracking System), and/or a speaker system (not shown) to verbally announce information regarding the status of orders. Some embodiments of the auxiliary systems also include the following software systems: a metrics system to visualize the time-to-pickup on a customer/store/corporate level, per-user customizations to define visuals that can be associated with a user and shown on the display 232, and a notification system to inform a user of order status through a push notification, email, text message, or other form of remote communication across one or more devices 310 (FIG. 7).

Referring to FIGS. 7-11, a smart handoff environment 300 that defines the smart handoff integrated platform 100/200 in communication with one or more devices 310 and the computer-implemented smart handoff system 500 is shown. Smart handoff environment 300 includes a communication network, which is a geographically distributed collection of devices interconnected by communication links and segments for transporting data there-between. The devices include, for example, electronic devices such as personal computers, laptops, tablets, mobile phones, and the like. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Referring to the figures, FIG. 7 illustrates a schematic diagram of the smart handoff environment 300 for implementation of the smart handoff integrated platform 100/200, which includes an example communication network 305 (e.g., the Internet). Communication network 305 is shown for purposes of illustration and can represent various types of networks, including local area networks (LANs), wide area networks (WANs), telecommunication networks (e.g., 4G, 5G, etc.), and so on.

As shown, communication network 305 includes a geographically distributed collection of client devices, such as devices 310a, 310b, and 310c (collectively, "devices 310"), as well as smart integrated handoff platform 100/200 and auxiliary display 320. Devices 310 are interconnected by communication links and/or network segments and exchange or transport data such as data packets 340 to/from the computer-implemented smart handoff system 500. Here, devices 310 include a computer 310a, a mobile device 310b, and a tablet 310c. The illustrated client devices represent specific types of electronic devices, but it is appreciated that devices 310 in the broader sense are not limited to such specific devices. For example, devices 310 can include any number of electronic devices such as laptops, smart watches, wearable smart devices, smart glasses, smart home devices, other wearables, and so on. In addition, those skilled in the art will understand that any number of devices and links may be used in communication network 305, and that the views shown by FIG. 7 is for simplicity and discussion. In some embodiments of the smart handoff environment 300, the devices 310 can be used to register, monitor and update orders with computer-implemented smart handoff system 500 and/or print or register the indicia 112 for placement with an item 10/20.

Data packets 340 represent network traffic or messages, which are exchanged between devices 310 and computer-implemented smart scheduling system 500 over communication network 305 using predefined network communication protocols such as wired protocols, wireless protocols (e.g., IEEE Std. 802.x, WiFi, Bluetooth®, etc.), Power Line Carrier (PLC) protocols, or other shared-media protocols where appropriate. In this context, a protocol comprises a set of rules defining how devices interact with each other.

Figure 8:
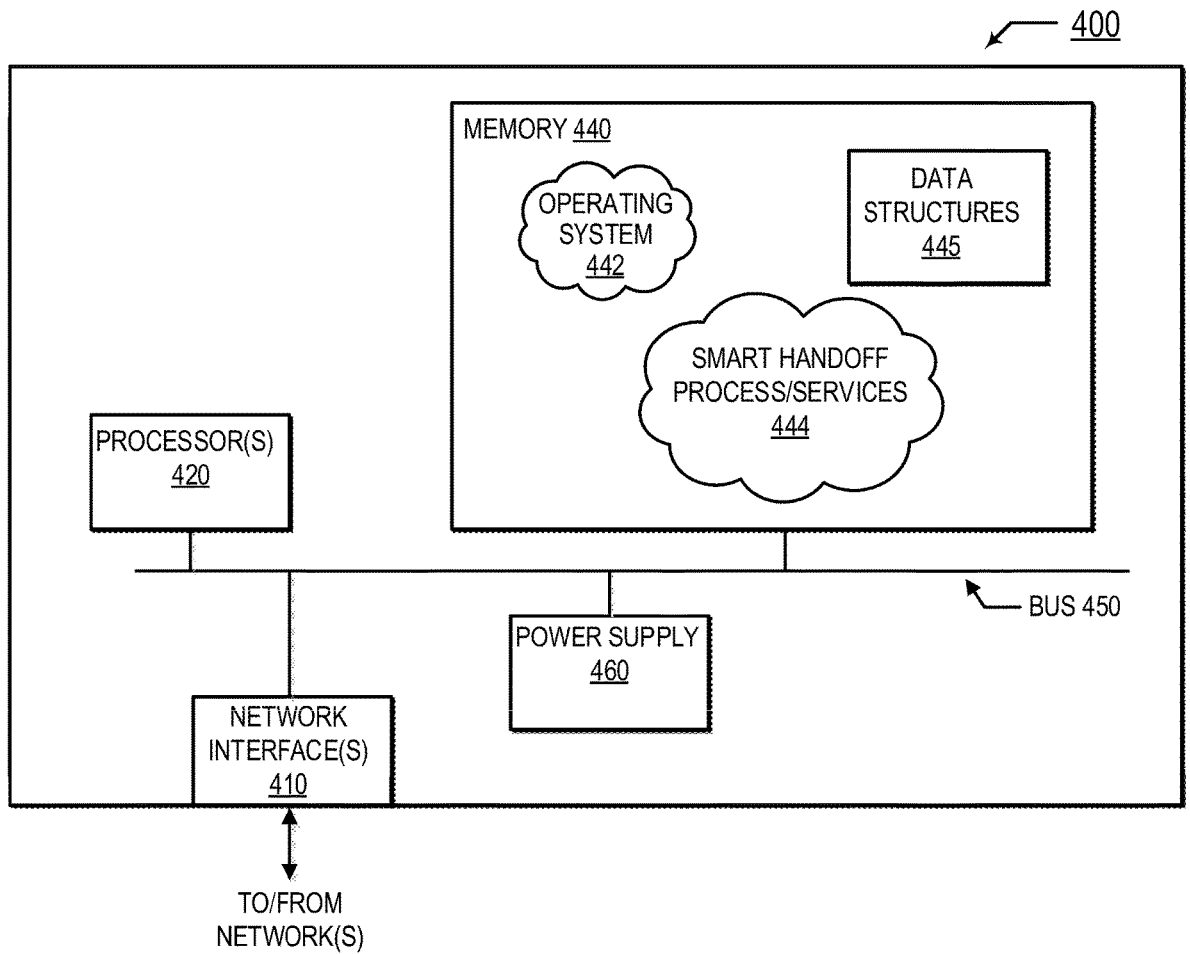
FIG. 8 is a simplified diagram showing an example computing device for implementation of a computer-implemented smart handoff system of the smart handoff integrated platform of FIG. 1 or FIG. 5.

FIG. 8 is a schematic block diagram of an example device 400 that may be used with one or more embodiments described herein, e.g., as a component of computer-implemented smart scheduling system 500 and/or as any one of devices 310 shown in FIG. 7.

Device 400 comprises one or more network interfaces 410 (e.g., wired, wireless, PLC, etc.), at least one processor 420, and a memory 440 interconnected by a system bus 450, as well as a power supply 460 (e.g., battery, plug-in, etc.).

Network interface(s) 410 contain the mechanical, electrical, and signaling circuitry for communicating data over the communication links coupled to communication network 305. Network interfaces 410 are configured to transmit and/or receive data using a variety of different communication protocols. As illustrated, the box representing network interfaces 410 is shown for simplicity, and it is appreciated that such interfaces may represent different types of network connections such as wireless and wired (physical) connections. Network interfaces 410 are shown separately from power supply 460, however it is appreciated that the interfaces that support PLC protocols may communicate through power supply 460 and/or may be an integral component coupled to power supply 460.

Memory 440 includes a plurality of storage locations that are addressable by processor 420 and network interfaces 410 for storing software programs and data structures associated with the embodiments described herein. In some embodiments, device 400 may have limited memory or no memory (e.g., no memory for storage other than for programs/processes operating on the device and associated caches).

Processor 420 comprises hardware elements or logic adapted to execute the software programs (e.g., instructions) and manipulate data structures 445. An operating system 442, portions of which are typically resident in memory 440 and executed by the processor, functionally organizes device 400 by, inter alia, invoking operations in support of software processes and/or services executing on the device. These software processes and/or services may comprise smart handoff process/services 444, described herein. Note that while smart handoff process/services 444 is illustrated in centralized memory 440, alternative embodiments provide for the process to be operated within the network interfaces 410, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the smart handoff process 444 is shown as a standalone process, those skilled in the art will appreciate that this process may be executed as a routine or module within other processes.

Figure 9:
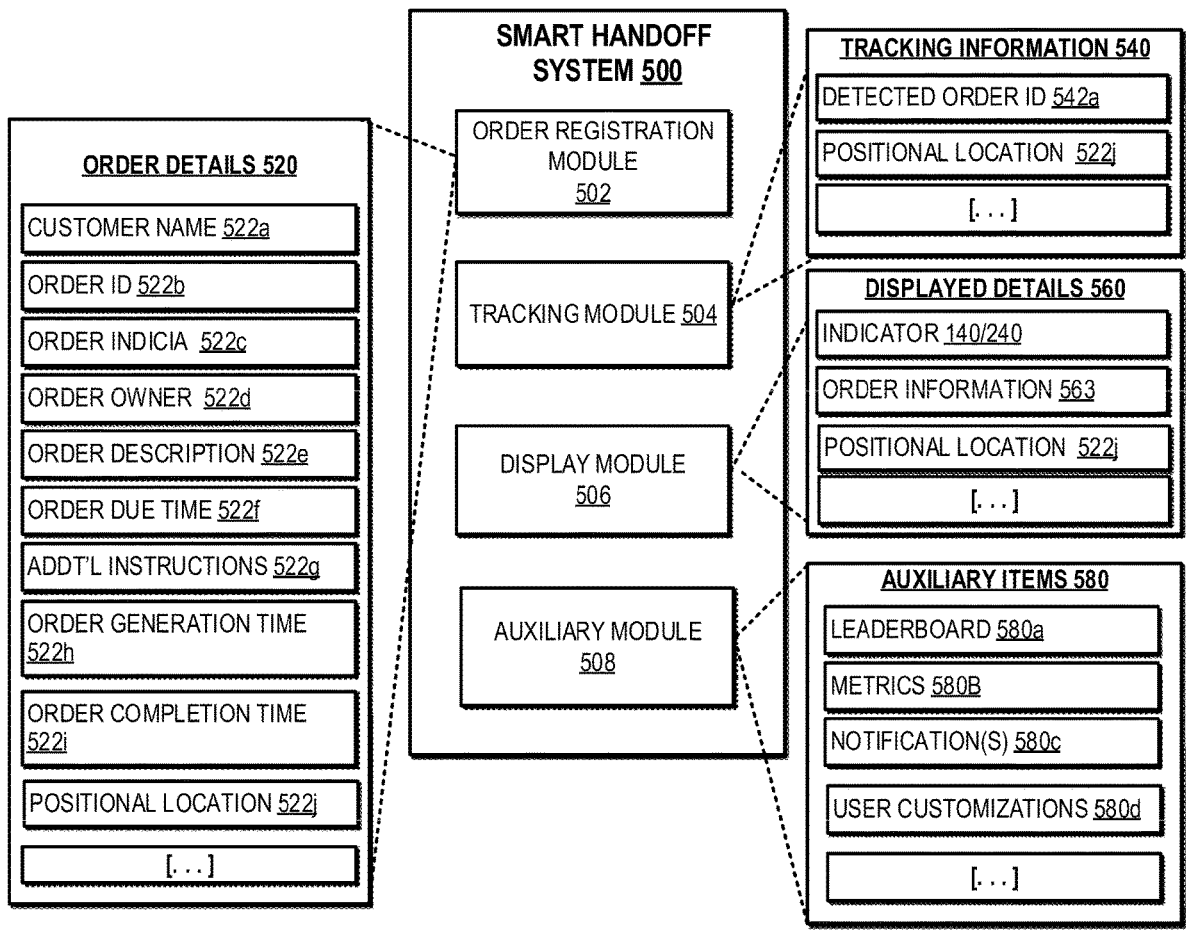
FIG. 9 is a simplified diagram showing the computer-implemented smart handoff system of FIG. 8.

Referring to FIG. 9, one embodiment of the computer-implemented smart handoff system 500 is illustrated defining a plurality of modules that interact with devices 310 and smart handoff integrated platform 100/200 to collectively register orders, track and recognize items 10/20 that are placed on the smart handoff integrated platform 100/200, display indicia 112/212 featuring individualized information about the order at a positional location of the item 10/20.

In particular, some embodiments of computer-implemented smart handoff system 500 include an order registration module 502 for intake and generation of order details 520. Order registration module 502 can accept order details 520 from customers or employees, including customer name 522a, order owner 522d (i.e. employee responsible for order fulfillment), order description 522e, and any additional instructions 522g, among other contemplated details such as a number of items in the order. Upon order creation, order registration module 502 can generate an order ID 522b and an associated order indicia 522c. Order details 520 can also include an order generation time 522h and an order due time 522f. Order details 520 that will not be immediately available upon registration but can be recorded and updated within the order details 520 can include a positional location 522j on the surface 130/230 and an order completion time 522j. In some embodiments, the order details 520 can be generated elsewhere, such as using an existing order intake system, and imported into the smart handoff system 500.

Smart handoff system 500 further includes a tracking module 504 for communication with the tracking system 104/204 of the smart handoff integrated platform 100/200 for receiving or otherwise interpreting tracking information 540 from the sensor 110/210 (FIGS. 1 and 5), including a detected order ID 542a and positional location 524b of an item 10/20 on the smart handoff integrated platform 100/200. Detected order ID 542a is ascertained by reading the indicia 112/212 on the item 10/20 and is used to associate the order details 520 with the detected item 10/20. Positional location 542b on the surface 130/230 as detected by the sensor 110/210 is stored in the order details 520.

Smart handoff system 500 further includes a display module 504 for generating displayed details 560 to be communicated to the display system 102/202 including the indicator 140/240 that includes information about the order. In particular, displayed details 560 can include the indicator 140/240 and associated order information 563 to be displayed on the indicator 140/240. Further, the positional location 522j of the item 10/20 having been updated by the tracking module 504 is also communicated to the display module 504 to allow the display module 504 to display the indicator 140/240 at the physical location of the item 10/20 on the surface 130/230.

In some embodiments, smart handoff system 500 defines one or more auxiliary modules 508 for facilitation of additional functionalities such as leaderboard 580a, metrics 580b, notifications 580c to customers and/or employees, and user customizations 580d. In some embodiments, the notifications 580c can be broadcast across devices 310 (FIG. 7) and can include updates on an order queue such as pickups, "late order" notifications, and order creation notifications. In some embodiments, user customizations 580d can enable generation and display of customized indicators. For instance, a customer may "design" or otherwise select a customized indicator 112/212 and associate the customized indicator with a user profile that is integrated with the order registration module 502.

Figure 10:
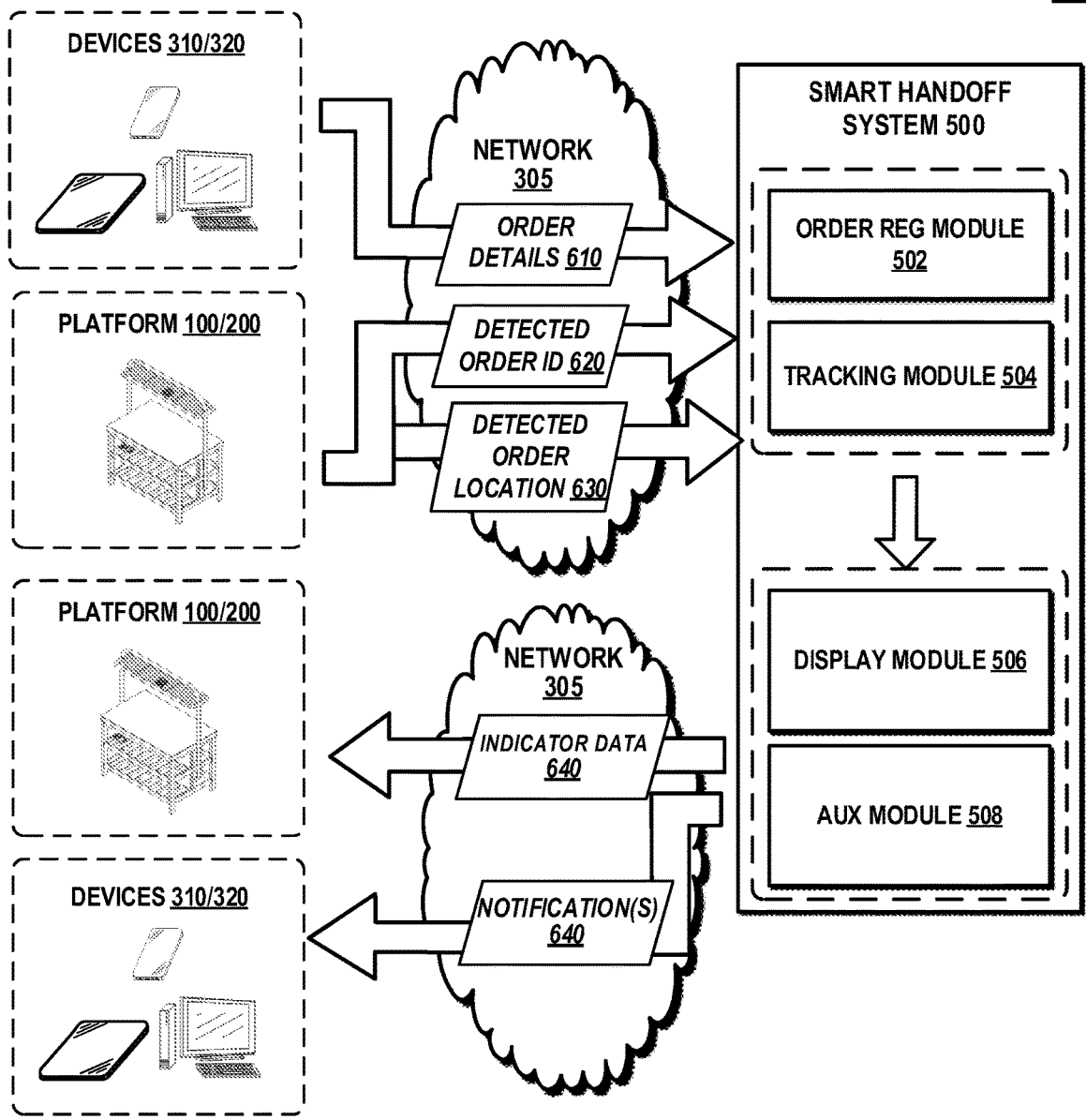
FIG. 10 is a simplified diagram showing data flow between the smart handoff integrated platform of FIGS. 1 and 5 and the smart handoff system of FIG. 8.

FIG. 10, illustrates a schematic block diagram 600 showing operations and data flow for smart handoff system 500. In particular, smart handoff system 500 receives order details 610 from a device 310 across network 305. In some embodiments, the order details 610 are received at order registration module 502. Upon placement of an item 10/20 having indicia 112 on the smart integrated handoff platform 100/200, a detected order ID 620 and corresponding detected position 630 of the item are relayed across network 305 to the tracking module 504 of smart handoff system 500. The order details 610, detected order ID 620 and detected position 630 are transmitted to the display module 506 for generation of the indicator 112/212. Indicator data 640 associated with indicator 112/212 is transmitted to the smart integrated handoff platform 100/200. Further, the order details 610 are transmitted to the auxiliary module 508 for transmission of notifications 640 and other auxiliary items 580 to devices 310.

Figure 11:
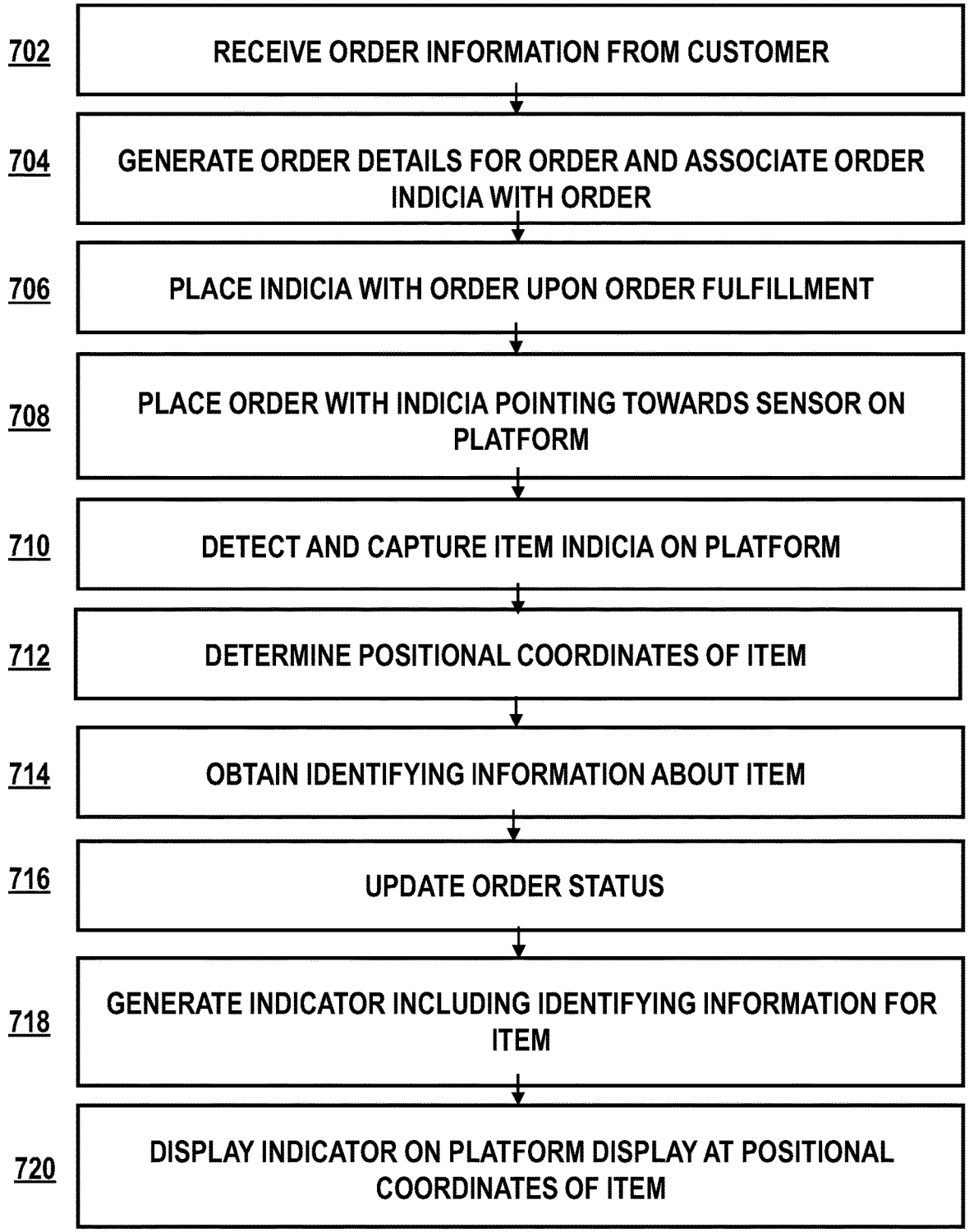
FIG. 11 is a process flow for tracking items in an order on a physical platform and displaying order-specific information using the smart handoff integrated platform of FIG. 1 or FIG. 5.

Referring to FIG. 11, illustrates an example simplified procedure 700 for smart product handoff in accordance with the examples and processes described above. For purposes of discussion, the operations for procedure 700 are described in the context of a system such as smart handoff system 500. However, it is appreciated that these operations may be performed by any number of systems and devices, including combinations of systems and devices in a distributed computing environment.

At block 702, order information is first received for an order from a customer at one or more devices 310 in communication with the smart handoff system 500 and smart handoff integrated platform 100/200. At block 704, order details are generated for the order based on the order information provided in block 702. In some embodiments, the order details are taken and stored by an order registration module 502. In other embodiments, the order details are taken and stored by an existing order registration system, but are communicable to the smart handoff system 500. In some embodiments, an indicia 112/212 is generated and printed to correspond with the order. In another embodiment, the indicia 112/212 is uniquely pre-printed and registered with the smart handoff system 500 to assign the indicia 112/212 to the order. In this manner, indicia 112/212 can be printed once and periodically re-used as orders are registered and cleared from smart handoff system 500.

At block 706, upon order fulfillment, the indicia 112/212 is placed with the order. In particular, in some embodiments, the indicia 112/212 is placed on top of an item 10/20 associated with the order. At block 708, the item 10/20 is placed on the surface 130/203 of the smart handoff integrated platform 100/200 with the indicia 112/212 pointing towards the sensor 110/210 of the smart handoff integrated platform 100/200.

At block 710, the tracking system 104/204 detects and captures the item 10/20 on the surface 130/230 and relays the information to the smart handoff system 500. At block 712, the tracking system 104/204 determines positional coordinates of the item 10/20 and communicates the positional coordinates to the smart handoff system 500. At block 714, the smart handoff system 500 then associates the indicia 112/212 with the order details to obtain identifying information about the item 10/20. At block 716, in some embodiments, the smart handoff system 500 updates an order status of the item 10/20 to indicate that the item 10/20 has been placed for pickup when the associated indicia 112/212 is detected. In some embodiments, the change in order status is reflected at auxiliary display 320 and can be updated within the leaderboard interface 170.

At block 718, with the identifying information associated with the item 10/20, the smart handoff system 500 generates an indicator 112/212 that includes identifying information about the item. At block 720, the smart handoff system 500 displays the indicator 112/212 at the location of the item 10/20 on the surface 130/230 of the smart handoff integrated platform 100/200.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A smart handoff environment, comprising:
a smart integrated handoff platform including a tracking system in communication with a display device;
wherein the display device is operable to display an indicator on a physical surface at a display coordinate relative to a coordinate space of the display device, wherein the physical surface is configured to support an item, wherein the display device comprises a display screen located underneath the physical surface; and
wherein the tracking system is operable to capture an indicia on the item and generate positional data indicative of a physical location of the indicia relative to the physical surface; and
a computer-implemented smart handoff system in operative communication with the tracking system, the computer-implemented smart handoff system including:
a processor in communication with a tangible storage medium storing instructions that are executed by the processor to perform operations comprising:
obtain a detected order identifier by capturing the indicia captured by the tracking system;
the positional data from the tracking system corresponding with the physical location of the indicia relative to the physical surface;
translate the positional data into a display coordinate relative to the coordinate space of the display device;
generate an indicator including information about the item based on the detected order identifier;
display the indicator on the display device of the physical surface at the display coordinate; and
update the display coordinate responsive to detected movement of the item on the physical surface.

2. The smart handoff environment of claim 1, wherein the tracking system iteratively detects and updates the positional data of the item relative to the physical surface.

3. The smart handoff environment of claim 1, wherein the display device comprises a projector oriented above or below the physical surface such that the indicator is cast onto the physical surface from the projector at the display coordinate.

4. The smart handoff environment of claim 1, wherein the tracking system comprises a camera.

5. The smart handoff environment of claim 1, wherein the tracking system identifies one or more corners of the indicia as one or more reference points to identify the positional data of the item relative to the physical surface.

6. The smart handoff environment of claim 1, wherein the tracking system is operable to detect and interpret a machine readable indicia.

7. The smart handoff environment of claim 1, wherein the indicia is a machine readable indicia and wherein the indicia is indicative of an order identifier when interpreted by the tracking system.

8. The smart handoff environment of claim 1, wherein the computer-implemented smart handoff system is further configured to associate the indicia with an order of a plurality of orders.

9. The smart handoff environment of claim 1, further comprising an auxiliary display in communication with the computer-implemented smart handoff system for displaying an order status of one or more orders of a plurality of orders.

10. The smart handoff environment of claim 1, wherein the computer-implemented smart handoff system is operable to receive and store order details for each order of a plurality of orders.

11. The smart handoff environment of claim 1, further comprising one or more devices, wherein the one or more devices are operable for receiving, updating and/or registering orders, and wherein the computer-implemented smart handoff system is operable to communicate with the one or more devices.

12. The smart handoff environment of claim 1, wherein the computer-implemented smart handoff system is configured to update a status of an order associated with the detected order identifier when the tracking system identifies the positional data of the item relative to the physical surface.

13. The smart handoff environment of claim 1, wherein the indicia is generated and printed at a device.

14. The smart handoff environment of claim 1, wherein the indicia is preprinted and is associated with an order upon registration.

15. A method, comprising:
utilizing a processor in communication with a tangible storage medium, a tracking system, and a display device, the display device being operable to display an indicator on a physical surface at a display coordinate relative to a coordinate space of the display device wherein the display device comprises a display screen located underneath the physical surface, and the tangible storage medium storing instructions that are executed by the processor to perform operations comprising:
obtain a detected order identifier by capturing an indicia on an item;
obtain positional data indicative of a physical location of the indicia relative to a physical surface;
translate the positional data into a display coordinate relative to the coordinate space of the display device;
generate an indicator including information about the item based on the detected order identifier;
display the indicator on the display device of the physical surface at the display coordinate; and
update the display coordinate responsive to detected movement of the item on the physical surface.

16. The method of claim 15, further comprising iteratively detecting and updating the positional data of the item relative to the physical surface.

17. The method of claim 15, further comprising associating the indicia with an order of a plurality of orders.

18. The method of claim 15, further comprising updating a status of an order associated with the detected order identifier when the tracking system identifies the positional data of the item relative to the physical surface.

19. A smart integrated handoff platform, comprising:
a display device in communication with a physical surface, wherein the display device is operable to display an indicator on the physical surface at a display coordinate relative to a coordinate space of the display device, wherein the physical surface is configured to support an item, wherein the display device comprises a display screen located underneath the physical surface;

a tracking system in communication with the display device, wherein the tracking system is operable to capture an indicia on an item and generate positional data indicative of a physical location of the indicia relative to the physical surface; and a processor in communication with a memory, the memory including instructions executable by the processor to translate the positional data into a display coordinate relative to the coordinate space of the display device, display the indicator on the display device at the display coordinate, and update the display coordinate responsive to detected movement of the item on the physical surface.

* * * * *